Figure 1:
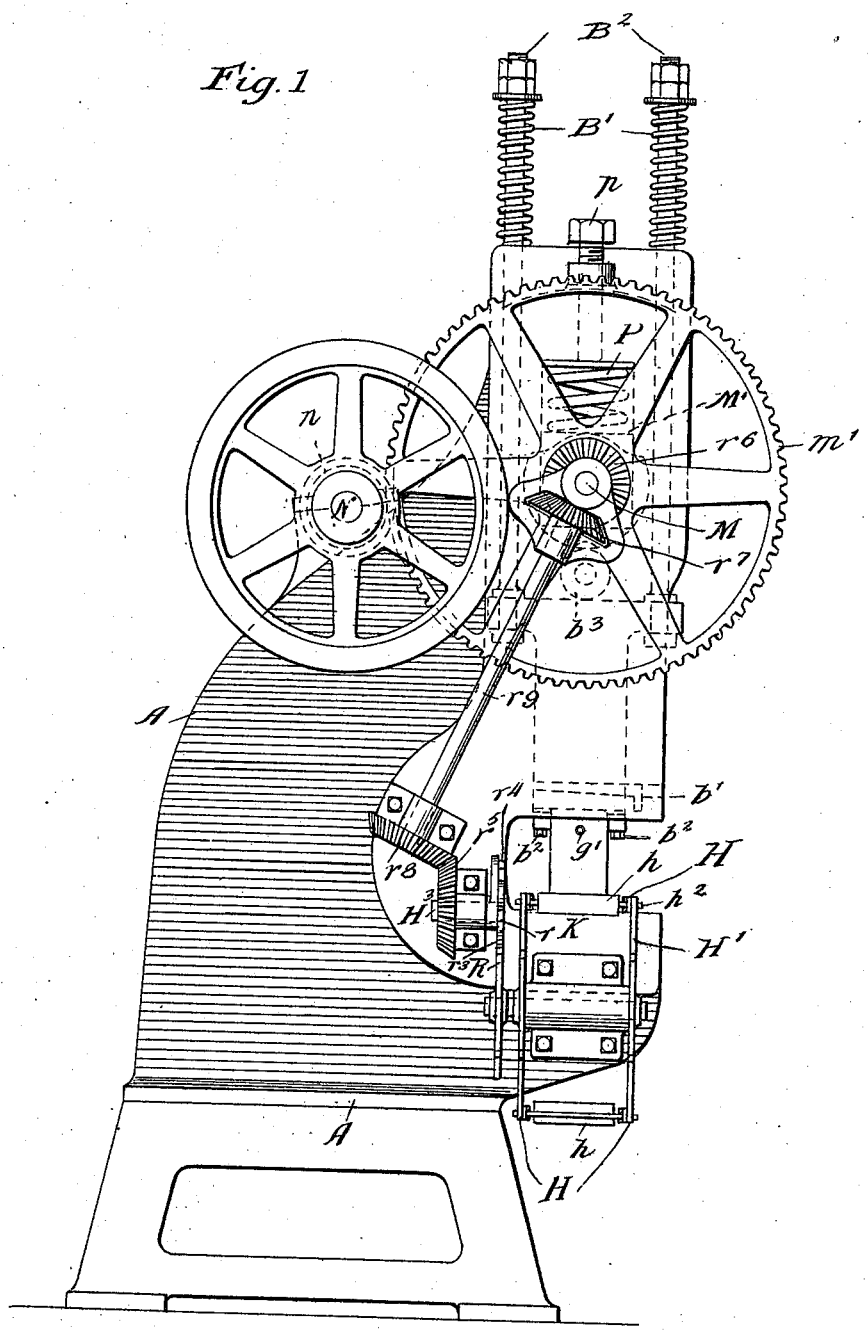

G. W. WEBER.
CAN FLANGE SWAGING AND SOLDERING MACHINE.
APPLICATION FILED JULY 8, 1907.

977,689.

Patented Dec. 6, 1910.

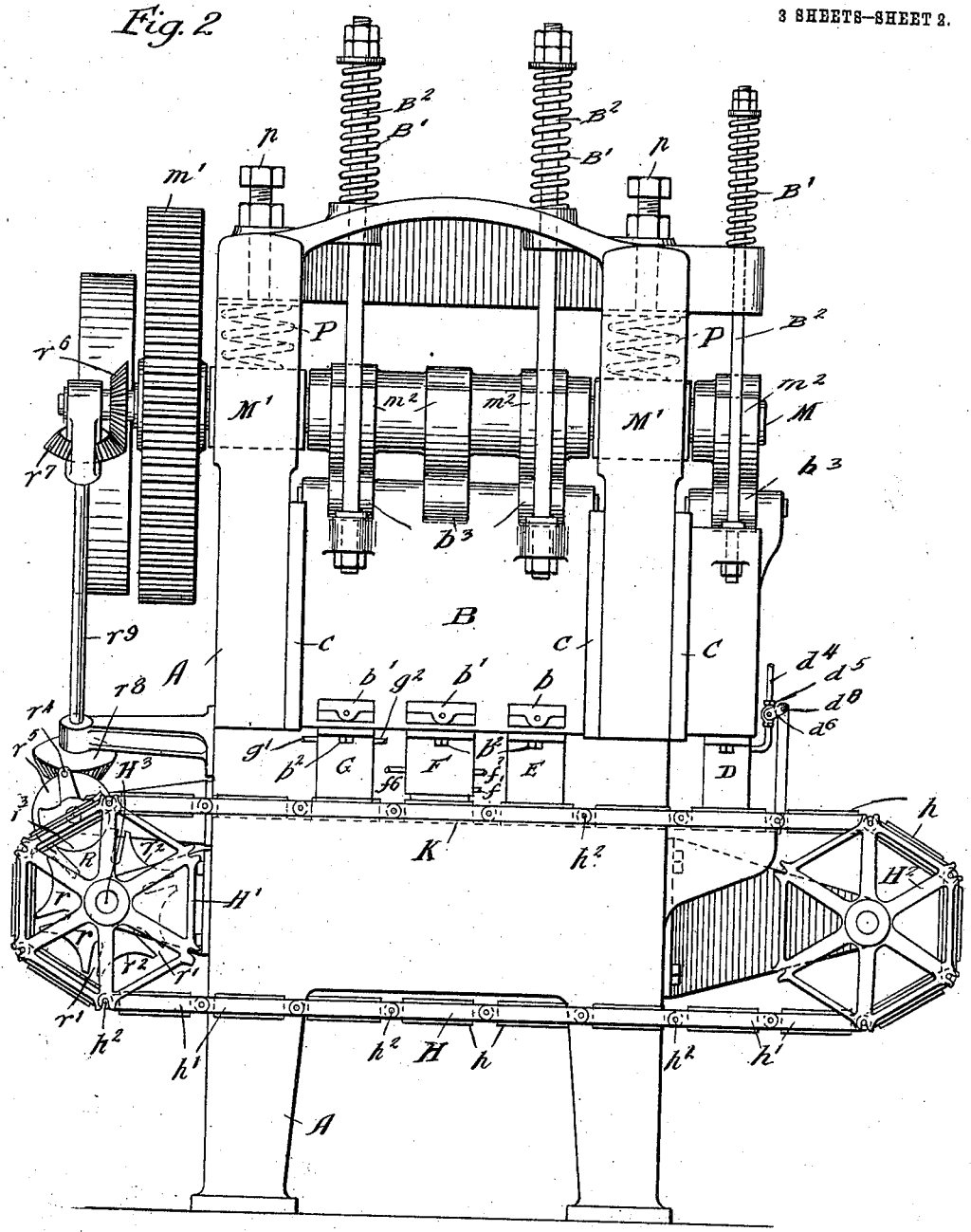

G. W. WEBER.
CAN FLANGE SWAGING AND SOLDERING MACHINE.
APPLICATION FILED JULY 8, 1907.
977,689.
Patented Dec. 6, 1910.
3 SHEETS—SHEET 3.
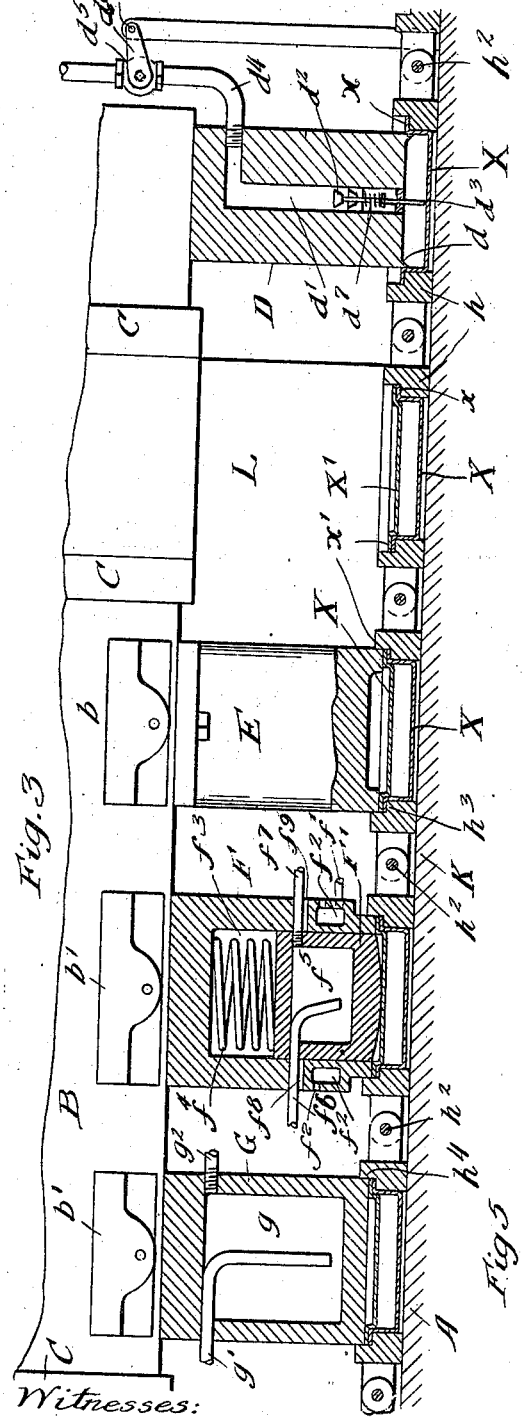
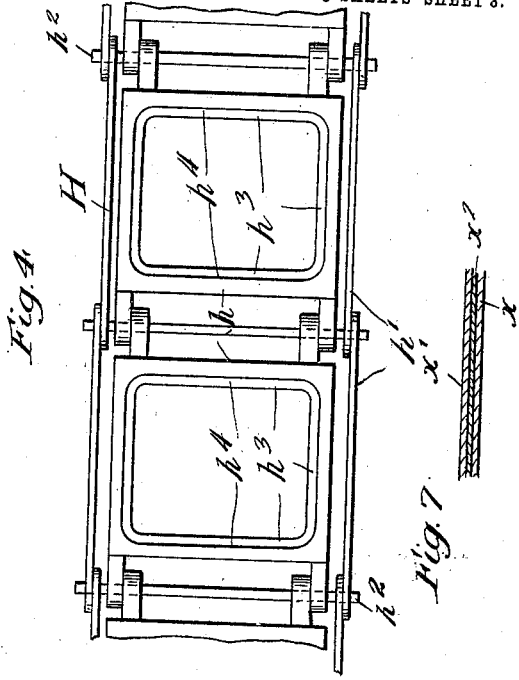
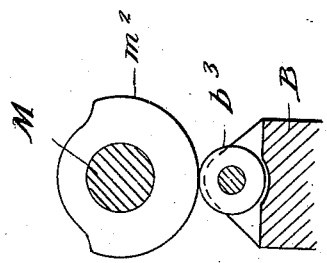
Witnesses:
Wm. Geiger
Pearl Abrams
Inventor:
George W Weber
By Munday, Evarts, Adcock & Clarke
his Attorneys

UNITED STATES PATENT OFFICE.

GEORGE W. WEBER, OF NEW YORK, N. Y., ASSIGNOR TO AMERICAN CAN COMPANY, OF NEW YORK, N. Y., A CORPORATION OF NEW JERSEY.

CAN-FLANGE SWAGING AND SOLDERING MACHINE.

977,689.

Specification of Letters Patent.

Patented Dec. 6, 1910.

Application filed July 8, 1907. Serial No. 382,724.

*To all whom it may concern:*

Be it known that I, GEORGE W. WEBER, a citizen of the United States, residing in New York, in the county of New York and State of New York, have invented a new and useful Improvement in Can-Flange Swaging and Soldering Machines, of which the following is a specification.

My invention relates to machines for soldering the covers on sardine or other cans, and more particularly upon cans having drawn or seamless bodies.

Heretofore in the practical use of sardine or other cans having drawn or seamless bodies, and especially cans of a rectangular shape with rounded corners, great difficulty is experienced in soldering the cover on the can with the requisite hermetic tightness owing to the fact that the drawing operation necessarily puckers and roughens the surface of the externally projecting flange on the can body, and also leaves the flange more or less wavy, warped or at variance from an exact and true plane, especially at the rounded corners of the rectangular can, and also because the drawing operation thins and frays the tin coating on the soldering flange of the body, and because the trimming operation of such flange (which is necessary to bring the flange of the drawn can body to a uniform width) leaves its outer edge with more or less of a bur. These several conditions prevent that close, smooth, flat metal to metal contact between the soldering flange of the body and the soldering flange of the cover necessary for the production of hermetically tight soldered joints with certainty and reliability.

The object of my invention is to provide a simple and efficient machine by means of which the covers may be rapidly and cheaply soldered on the drawn or seamless bodies of sardine or other cans after they are filled and by which the difficulties or objections heretofore experienced may be practically overcome or obviated and perfect hermetically tight solder joints produced.

The machine which I have devised to accomplish this object or result is designed and intended for successful operation upon drawn cans, having externally projecting flanges provided with a film or coating of solder fusibly united to the tin coating of the flanges.

The machine embodying my invention comprises in coöperative combination the following devices: A movable carrier or conveyer having a series of can body flange swaging dies for supporting the sardine or other can body by its externally projecting flange; a filling plunger for forcing or leveling the sardines or other material in the can and clearing the upper surface of the soldering flange from projecting pieces of fish, scale, skin, tail, etc., as far as may be, and supplying to each can the necessary oil or other liquid; a coöperating movable swaging die for swaging and pressing together under great pressure the soldering flanges of the can body and cover and thus removing from the body flange the "drawing" puckers, creases, warpings or other irregularities and bringing the cover and body flanges into snug, close, metal to metal contact throughout and causing the finer puckers or irregularities which are not smoothed out by the swaging operation to be embedded in the solder coating between the superposed flanges, and in a measure partially cold welding the flanges together; a coöperating swaging and fusing die to fuse and weld the flanges of the body and cover together under pressure; an independently movable cover holder for such heated swaging die operating to press and hold the cover on the body until the heated swaging die is withdrawn; and a coöperating cooling swaging die to snugly close together any interstices or leaks that might remain or be due to pieces of fish or scale or other foreign substance between the flanges of the body and cover at any point or points.

My invention consists in the novel construction of parts and devices and in the novel combinations of parts and devices herein shown and described and more particularly specified in the claims.

In the drawing forming a part of this specification, Figure 1 is a side elevation of a can flange swaging and soldering machine embodying my invention. Fig. 2 is a front elevation. Fig. 3 is a detail vertical longitudinal section through the upper and lower dies. Fig. 4 is a detail plan view of a portion of the carrier and lower dies carried thereby. Fig. 5 is a detail view of one of the cams for operating the cross head. Fig. 6 is a detail enlarged section through the soldering flanges of the can body and cover before the die swaging operation and Fig. 7 is a similar view after the flanges have been operated upon by the swaging dies.

In the drawing, A represents the frame of the machine. B a vertically movable cross head reciprocating in suitable guides or ways C on the frame of the machine for operating a series of plungers or dies D, E, F, G, each preferably adjustably connected to the cross head by wedges $b$ $b^1$ and bolts $b^2$.

H is a horizontally movable can body carrier having a series of dies $h$ for supporting the can bodies X by their externally seaming flanges $x$ and which coöperate each in turn successively with the dies D, E, F, G on the cross head B. The can body die carrier H is preferably a flexible or chain carrier and comprises a series of links $h^1$ connected together by cross pins $h^2$.

K is an anvil block or guide to support the dies $h$ against the thrust of the reciprocating dies or plungers D, E, F, G, the anvil block being secured to or made integral with the frame A. Each of the dies $h$ has a recess $h^3$ forming an upwardly projecting wall $h^4$ to receive and surround the flange $x$ of the can body X and thus hold the can body securely in position in the die $h$.

The reciprocating filling plunger or die D fits snugly within the mouth of the can body X and is preferably furnished with a marginal downwardly projecting flange $d$ to aid in forcing and leveling the sardines, fish or other material within the can and clearing the soldering flange $x$ of the can body from projecting pieces of fish, scale, skin, tail, etc. The filling plunger or die D is also provided with a duct or channel $d^1$ for supplying oil or other liquid to the can as may be desired. This oil filling duct or chamber $d^1$ is preferably furnished with a valve $d^2$ having a stem $d^3$ for opening the same as the plunger approaches the end of its downward stroke. The supply pipe $d^4$ is also preferably furnished with a valve $d^5$ which is opened on the upward stroke of the filling plunger D by an arm $d^6$ hinged to the stationary stud $d^8$ the two valves thus operating as a measuring device so that on each downward stroke of the filling plunger a measured quantity of oil, that contained between the two valves, is delivered into each can. A spring $d^7$ holds the valve $d^2$ normally closed, and the arm $d^6$ holds the valve $d^5$ normally open or closed as required. The valves, it will be observed are opened alternately, one on the down stroke and the other on the up stroke of the filling plunger.

The carrier H has an intermittent or step by step movement and after the can X has been operated upon by the filling plunger D, it is moved forward one step to the station L where the cover $X^1$ is fed or slipped into the die $h$ with its soldering flange $x^1$ on top of the soldering flange $x$ of the can body X.

The feeding or delivery of the can cover $X^1$ onto the can body may be done by any suitable means, mechanical or otherwise; as illustrated in the drawing is intended to be done by hand. At the next forward step of the carrier H, the can body X in the die $h$ is moved into registry with the swaging die E, by which, in connection with the die $h$, the "drawing" puckers, creases, warpings or other irregularities which prevent a snug, close, flat, metal to metal contact between the soldering flanges of the body and cover, are swaged out, as shown in Fig. 7. At the next forward step of the carrier H, the can body with the cover thereon is brought into registry with the hot swaging die F, which, in coöperation with the carrier die $h$ hot swages or fuses and welds the soldering flanges of the body and cover securely together. The hot swaging die F is preferably hollow, or furnished with a heating chamber $f$ into which gas mixed with air in suitable proportions is admitted through the burner pipe $f^1$. The hot swaging die F is also furnished with orifices $f^2$ for escape of products of combustion. The hot swaging die F should preferably be kept heated to a temperature of about five hundred to eight hundred degrees Fah., so that during the downward stroke and dwell of the hot swaging die against the can body flange, the film of solder $x^2$ with which the can body flange $x$ is coated will be fused or brought so nearly to a state of fusion that the can body and can cover flanges under pressure of the upper and lower dies F, $h$, will be securely hot welded or fused together.

The hot swaging die F is preferably furnished with an independently movable cover holder $F^1$ which is preferably mounted within a cavity $f^3$ in the hot swaging die F. A spring $f^4$ acts against the cover holder $F^1$ and causes it to press against the cover in advance of the die F on the down stroke and to hold the cover firmly seated until the hot swaging die F is partially withdrawn from the cover. The cover holder $F^1$ for the hot swaging die preferably has a hollow chamber $f^5$ into which water or other cooling fluid is admitted through the pipes $f^6$ $f^7$. The water pipes $f^6$ $f^7$ extend through slots $f^8$ $f^9$ in the hot swaging die F and limit the movement of the cover holder $F^1$ in respect thereto. At the next forward step of the carrier H, the can X with its cover $X^1$ soldered or fused thereon is brought into registry with the cooling and closing die G, which preferably has a hollow chamber or cavity $g$ to admit water or other cooling fluid through the water supply pipe $g^1$ and exit pipe $g^2$. By the stroke of the cooling and closing die G on the flanges $x$ $x^1$ of the can body and cover any possible leaks or crevices between the flanges incident to interposed pieces of fish, skin, fin, scale, tail or other obstructions will be effectually closed. The coöperative action of the cooling and closing die G with the can body supporting die h also serves to quickly cool the solder united flanges.

M is the main cam shaft of the machine journaled in suitable boxes $M^1$ on the frame and having a gear $m^1$ meshing with the gear n on the driving shaft N. The cam shaft M is preferably furnished with two or more, preferably four similar cams $m^2$ for engaging anti-friction rollers $b^3$ on the cross head B to operate the cross head. These cams are preferably shaped about as illustrated in Fig. 5 so as to cause the several dies D, E, F, G to make their up and down strokes during about one third of each revolution and then to give the several dies a dwell at their lowermost position during about two thirds of a revolution of the cam shaft. This dwell is especially important for the hot swaging die F and also aids the operation of the cooling die G, as it gives time for the heat of the hot die F to act upon the solder coating $x^2$ of the can body flange and the tin coating of the can cover flange to effect a fusion or welding of the metals together, and as it also gives time for the cooling die G to effectually set the fused solder or metal between the soldering flanges. This dwell is also serviceable for the filling die or plunger D, as it gives time for the oil or other liquid supplied to the can to flow into the same before the die begins to be withdrawn from the can. This dwell is also serviceable for the swaging die E as it prevents any quick rebound or separation of the dies E and h which might tend to separate or permit the separation of the soldering flanges x and $x^1$ of the can body and cover after being struck by the swaging die E.

The journal boxes $M^1$ of the cam shaft M are preferably yieldingly held in place by powerful springs P, the tension of which may be regulated by adjusting screws p. This yielding spring backing or support for the cross head operating cam shaft gives a yielding pressure of the dies D, E, F, G against the can body flanges while not interfering with the proper swaging action of the dies in removing or obliterating the "drawing" puckers, creases or irregularities in the can body flanges.

To partially counterbalance the cross head B and aid in withdrawing the dies carried thereby, it is furnished with counterbalance springs $B^1$ surrounding rods $B^2$ connected with the cross head.

The carrier H is mounted on sprocket wheels $H^1$ $H^2$ and its required intermediate or step by step movement is imparted to it, preferably by a Geneva stop or other suitable mechanism R comprising the stop disk r on the shaft $H^3$ and the coöperating stop disk to which the reference letter R is particularly applied on the shaft $H^{13}$ of the sprocket wheel $H^1$, said stop disk having radial slots $r^1$ and curved faces $r^2$ engaging the curved faces $r^3$ and pins $r^4$ on the continuously rotating disk r on the shaft $H^3$ of the gear $r^5$ to which motion is communicated from the cam shaft M by bevel gears $r^6$ on the cam shafts M, and bevel gears $r^7$ and $r^8$ on the countershaft $r^9$, the latter gear $r^8$ meshing with the gear $r^5$ of the Geneva stop mechanism.

While the machine of my invention is specially designed and intended for operation upon drawn cans, the externally projecting soldering flanges of which are more or less puckered, creased and warped by the drawing operation, it will be understood by those skilled in the art that my improved machine may be used for soldering the covers on other cans than drawn cans, and that, in operating upon cans wherein the soldering flanges of the can body and cover have slight, if any, puckers, creases, warpings or irregularities, the several swaging plungers or dies E, F, G may be adjusted to exert greater or less pressure or swaging action upon the can body and cover flanges as may be required.

I claim:—

1. In a can-body and can-cover flange swaging and soldering machine, the combination of an intermittently movable carrier having a series of can body flange engaging dies for supporting the can bodies by their externally projecting soldering flanges, of a filling plunger for forcing or leveling the material in the can and clearing the upper surface of the can body flange from projecting pieces and supplying to each can the desired oil or liquid, a swaging die for swaging and pressing together the soldering flanges of the body and cover and removing "drawing" puckers, creases, warpings and other irregularities from the body flange, a heated swaging die for fusing or welding the flanges of body and cover together under pressure, an independently movable cover holder for the heated swaging die, a cooling and closing die to close together any remaining leaks or interstices, a reciprocating cross head for operating said dies, and means for intermittently moving the carrier to bring the several can body supporting dies thereon into registry successively with the several dies on the cross head, substantially as specified.

2. The combination of a movable carrier having a series of can body flange engaging dies for supporting the can bodies by their externally projecting soldering flanges, of a swaging die for pressing together the soldering flanges of the body and cover and removing "drawing" puckers, creases, warpings and other irregularities from the body flange, a heated swaging die for fusing or welding the flanges of body and cover together under pressure, an independently movable cover holder for the heated swaging die, and a cooling and closing die, substantially as specified.

3. The combination of a movable carrier having can body flange engaging dies for supporting the can bodies by their externally projecting soldering flanges, of a swaging die coöperating in turn with each of said dies on said carrier for pressing together the soldering flanges of the can body and cover and a heated swaging die coöperating in turn with each of said dies on said carrier for fusing or welding the flanges of body and cover together under pressure, and a stationary anvil bed to support said can body flange engaging dies and resist the thrust of said swaging die and of said heated swaging die, substantially as specified.

4. The combination with a carrier having a series of can body flange engaging dies, of an opposing heated die coöperating in turn with each of said dies on said carrier for fusing or welding the flanges of body and cover together under pressure, and a stationary anvil bed to support said can body flange engaging dies and resist the thrust of said opposing heated die, substantially as specified.

5. The combination with a carrier having a series of can body flange engaging dies, of an opposing heated die for fusing or welding the flanges of body and cover together under pressure, and a cooling and closing die, and a stationary anvil bed to support said can body flange engaging dies and resist the thrust of said opposing heated die and of said cooling and closing die, substantially as specified.

6. In a machine for soldering covers on can bodies having externally projecting soldering flanges, the combination with a carrier having a plurality of lower dies each adapted to support and engage the soldering flange of the body, of a heated opposing die coöperating in turn with each of said dies on said carrier for pressing and fusing the soldering flange of the cover on the soldering flange of the body, and a stationary anvil bed to support said can body flange engaging dies and resist the thrust of said opposing heated die, substantially as specified.

7. In a machine for soldering covers on can bodies having externally projecting soldering flanges, the combination with a lower die engaging the soldering flange of the body, of a heated opposing die for pressing and fusing the soldering flange of the cover on the soldering flange of the body, and an independently movable cover holder for said heated die, substantially as specified.

8. In a machine for soldering covers on can bodies having externally projecting soldering flanges, the combination with a lower die engaging the soldering flange of the body, of a heated opposing die for pressing and fusing the soldering flange of the cover on the soldering flange of the body, and a closing die, substantially as specified.

9. In a machine for soldering covers on can bodies having externally projecting soldering flanges, the combination with a lower die engaging the soldering flange of the body, of a heated opposing die for pressing and fusing the soldering flange of the cover on the soldering flange of the body, an independently movable cover holder for said heated die, and a closing die, substantially as specified.

10. The combination with a traveling lower die engaging the soldering flange of the can body, of an opposing die for pressing the soldering flanges of cover and body flat together, and a heated fusing die, substantially as specified.

11. The combination with a traveling lower die engaging the soldering flange of the can body, of an opposing die for pressing the soldering flanges of cover and body flat together, a heated fusing die and a closing die, substantially as specified.

12. The combination with a traveling lower die engaging the soldering flange of the can body, of an opposing die for pressing the soldering flanges of cover and body flat together, a heated fusing die, a closing die, and a filling plunger, substantially as specified.

13. The combination with a traveling lower die engaging the soldering flange of the can body, of an opposing die for pressing the soldering flanges of cover and body flat together, a heated fusing die, a closing die, and a filling plunger having a liquid supply duct, substantially as specified.

14. The combination with a traveling lower die engaging the soldering flange of the can body, of an opposing die for pressing the soldering flanges of cover and body flat together, a heated fusing die, a closing die, a filling plunger having a liquid supply duct and valves to control the supply of liquid to each can, substantially as specified.

15. The combination with a movable carrier having a plurality of can body holding dies engaging the externally projecting soldering flanges on the can bodies, of a filling plunger and a die for pressing the soldering flanges of the cover and body together, substantially as specified.

16. The combination with a movable carrier having a plurality of can body holding dies engaging the externally projecting soldering flanges on the can bodies, of a filling plunger, a die for pressing the soldering flanges of the cover and body together, and a fusing die, substantially as specified.

17. The combination with a movable carrier having a plurality of can body holding dies engaging the externally projecting soldering flanges on the can bodies, of a filling plunger, a die for pressing the soldering flanges of the cover and body together, a fusing die, and a closing die, substantially as specified.

18. The combination with a movable carrier having a plurality of can body holding dies engaging the externally projecting soldering flanges on the can bodies, of a filling plunger, a die for pressing the soldering flanges of the cover and body together, a fusing die, and a closing die, said fusing die having an independently movable cover holder, substantially as specified.

19. The combination with a movable carrier having a plurality of can body holding dies engaging the externally projecting soldering flanges on the can bodies, of a filling plunger, and a die for pressing the soldering flanges of the cover and body together, said filling plunger having a marginal downwardly projecting flange, substantially as specified.

20. The combination with a movable carrier having a plurality of can body holding dies engaging the externally projecting soldering flanges on the can bodies, of a filling plunger and a die for pressing the soldering flanges of the cover and body together, said filling plunger having a liquid supply duct and a valve, substantially as specified.

21. The combination with a movable carrier having a plurality of can body holding dies engaging the externally projecting soldering flanges of the can bodies, of an opposing heated fusing die coöperating in turn with each of said dies on said carrier, and a stationary anvil bed to support said can body flange engaging dies and resist the thrust of said opposing heated die substantially as specified.

22. The combination with a movable carrier having a plurality of can body holding dies engaging the externally projecting soldering flanges of the can bodies, of an opposing heated fusing die, and an independently movable cover holder, substantially as specified.

23. The combination with a movable carrier having a plurality of can body holding dies engaging the externally projecting soldering flanges of the can bodies, of an opposing heated fusing die, and an independently movable cover holder having a cooling chamber, substantially as specified.

24. The combination with a movable carrier having a plurality of can body holding dies engaging the externally projecting soldering flanges of the can bodies, of an opposing heated fusing die, an independently movable cover holder having a cooling chamber, and a closing die, substantially as specified.

25. The combination with a movable carrier having a plurality of can body holding dies engaging the externally projecting soldering flanges of the can bodies, of an opposing heated fusing die, an independently movable cover holder having a cooling chamber, and a closing die having a cooling chamber, substantially as specified.

26. The combination with a movable carrier having a plurality of can body holding dies engaging the externally projecting soldering flanges of the can bodies, of an opposing die for pressing the soldering flanges of the can body and cover together, and a heated fusing die, substantially as specified.

27. The combination with a movable carrier having a plurality of can body holding dies engaging the externally projecting soldering flanges of the can bodies, of an opposing die for pressing the soldering flanges of the can body and cover together, and a heated fusing die, said fusing die having an internal heating chamber, substantially as specified.

28. The combination with a movable carrier having a plurality of can body holding dies engaging the externally projecting soldering flanges of the can bodies, of an opposing die for pressing the soldering flanges of the can body and cover together, a heated fusing die, and a cover holder for said fusing die, substantially as specified.

29. The combination with a movable carrier having a plurality of can body holding dies engaging the externally projecting soldering flanges of the can bodies, of an opposing die for pressing the soldering flanges of the can body and cover together, a heated fusing die, and a cover holder for said fusing die having an internal cooling chamber, substantially as specified.

30. The combination with a movable carrier having a plurality of can body holding dies engaging the externally projecting soldering flanges of the can bodies, of an opposing die for pressing the soldering flanges of the can body and cover together, a heated fusing die, a cover holder for said fusing die, and a closing die, substantially as specified.

31. The combination with a movable carrier having a plurality of can body holding dies engaging the externally projecting soldering flanges of the can bodies, of an opposing die for pressing the soldering flanges of the can body and cover together, a heated fusing die, a cover holder for said fusing die, and a closing die having an internal cooling chamber, substantially as specified.

32. The combination with a movable carrier having a plurality of can body holding dies engaging the externally projecting soldering flanges of the can bodies, of an opposing die for pressing the soldering flanges of the can body and cover together, a heated fusing die, a cover holder for said fusing die, a closing die and a filling plunger, substantially as specified.

33. The combination with a movable carrier having a plurality of can body holding dies engaging the externally projecting soldering flanges of the can bodies, of an opposing die for pressing the soldering flanges of the can body and cover together, a heated fusing die, a cover holder for said fusing die, a closing die, and a filling plunger having a liquid supply duct and valve, substantially as specified.

GEORGE W. WEBER.

Witnesses:
 JAMES E. McNELLIE,
 BERT L. WRIGHT.